Patented June 14, 1932

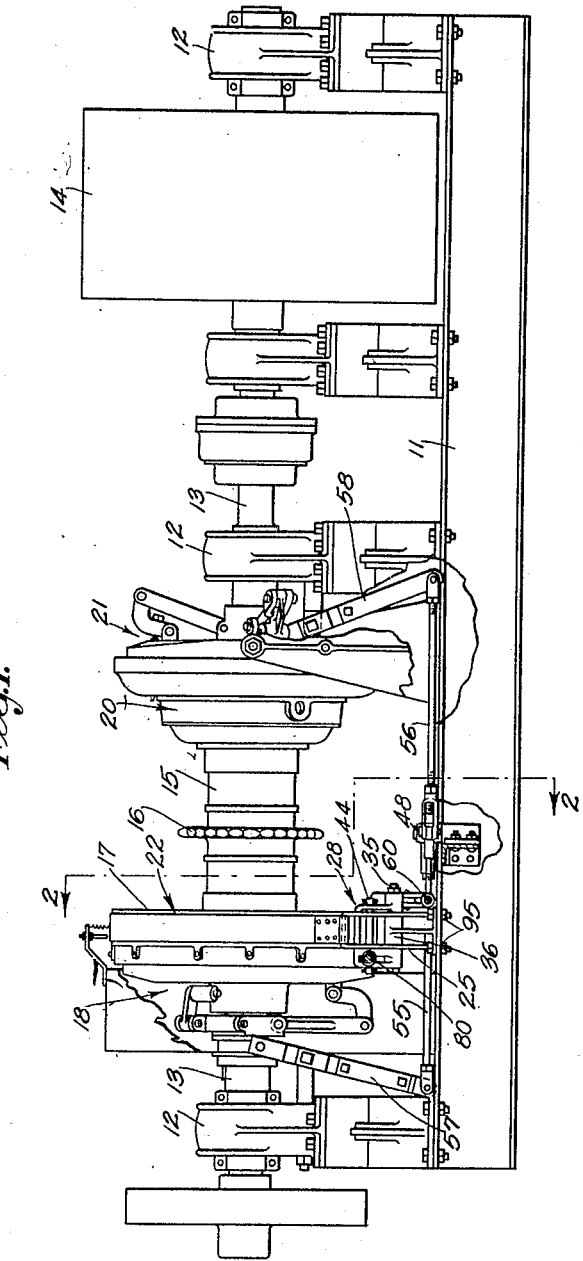

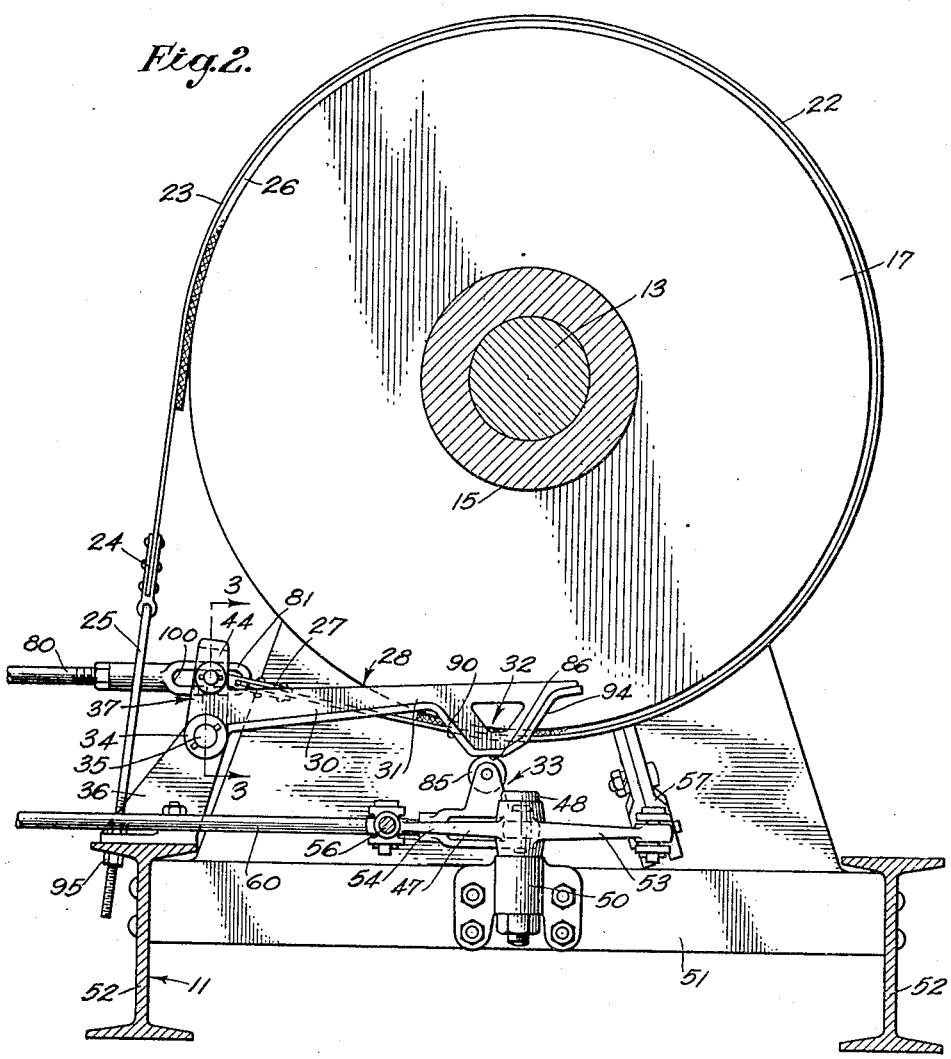
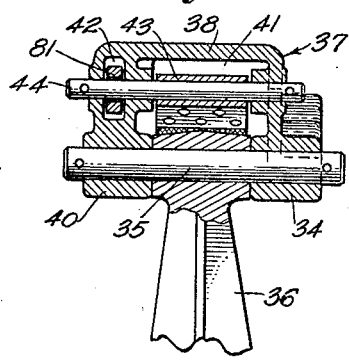

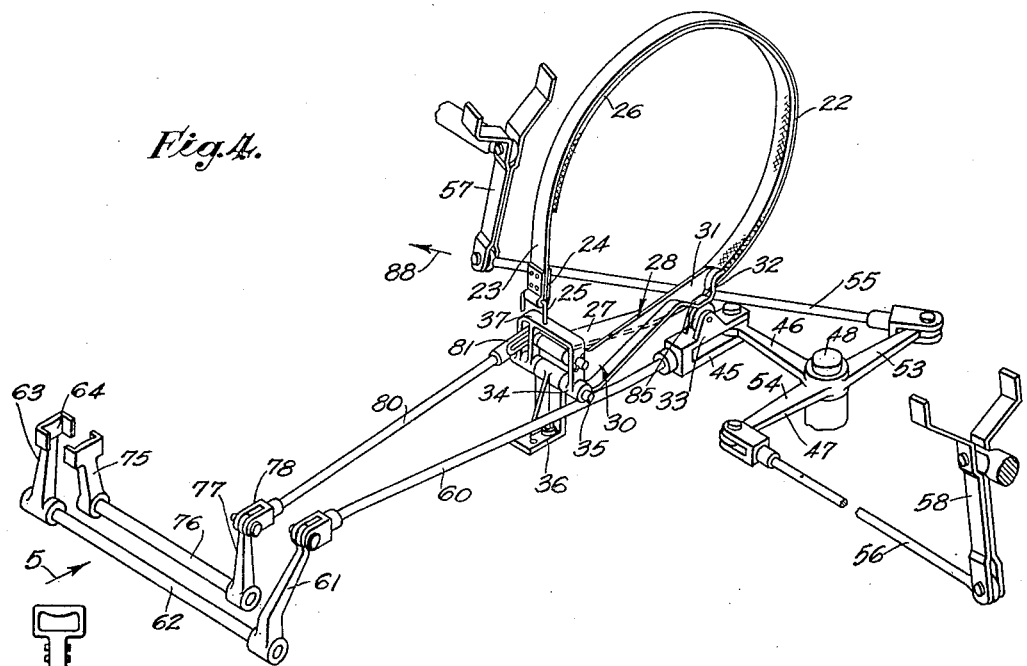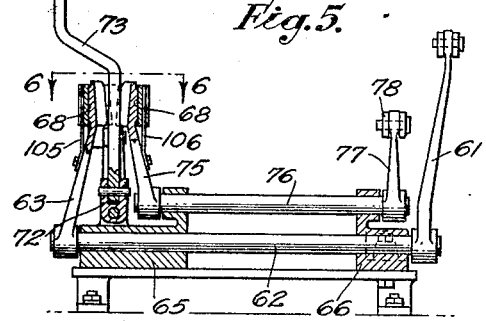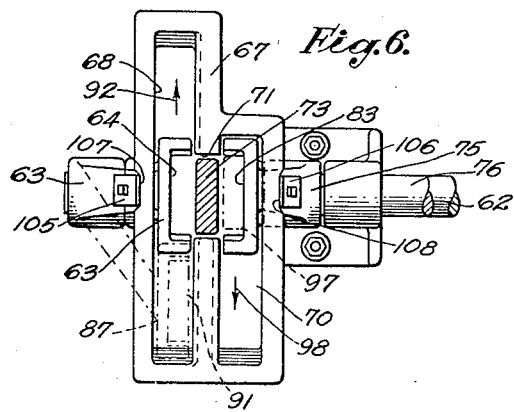

1,862,871

UNITED STATES PATENT OFFICE

GUGLIELMO TREMOLADA, OF LOS ANGELES, CALIFORNIA, ASSIGNOR OF ONE-HALF TO EMSCO DERRICK & EQUIPMENT COMPANY, OF LOS ANGELES, CALIFORNIA, A CORPORATION OF CALIFORNIA

REVERSE GEAR MECHANISM

Application filed April 7, 1930. Serial No. 442,093.

My invention relates to reverse gear mechanisms which are customarily placed between a drive member and a driven member so as to enable the transmission of power from the drive mechanism to the driven mechanism in either forward or reverse directions of rotation.

The customary form adopted in a reverse gear mechanism includes a drive shaft having a pulley or gear by which it may be driven from a source of power, such as an engine or electric motor, a driven member loosely mounted on the drive shaft, a direct or forward drive clutch situated at one end of the driven member, reversing gears at the opposite end of the driven member and a clutch for causing operation of the reversing gears. Either of the clutches may be selectively operated so as to drive the driven member in forward or reverse directions as may be desired by the operator.

My present invention comprehends a reverse gear mechanism having a brake which will operate to stop the driven member of the reverse gear mechanism when both the forward drive clutch and the reverse drive clutch thereof are disengaged, or in other words, when the reverse gear mechanism is in neutral.

In the preferred form of my invention, a single lever is so connected with a clutch operating mechanism that when this lever is moved in one direction, the neutral brake will be released and one of the clutches of the mechanism will be applied, and when the control lever is then moved in opposite direction, the neutral brake will be applied as the control passes through the neutral position and will then be released as the other clutch of the reverse gear mechanism is applied. In this manner the neutral brake operates to stop the driven member during the changing of the reverse gear mechanism from forward drive to reverse drive or vice versa. The applying of the neutral brake is accomplished by a follower which operates in conjunction with a cam, the result of this means of operation being that the pressure with which the neutral brake is applied is determined solely by the throw of the cam. When the neutral brake is first adjusted the neutral brake will be applied with such pressure that when the reverse gear mechanism is in neutral position, the driven member will be positively held against rotation under load; but when the brake band becomes slightly worn, or the neutral clutch loses its perfect adjustment by any other reason, its ability to positively grip the driven member is impaired, with the result that the driven member will move slowly under the load applied thereto. Also, should the coefficient of friction existing between the brake drum and the brake band be changed, as by splashing of oil or water on the brake mechanism, the gripping effect of the brake will change accordingly. To take care of any such emergency as indicated above, my invention includes an auxiliary braking means which will operate positively to hold the driven member against rotation when the clutch mechanism is in neutral position.

It is an object of the invention to provide a simple form of forward and reverse clutch operating mechanism together with a neutral brake which will stop the driven member of the reverse gear mechanism when the mechanism is in neutral position.

It is also an object of the invention to provide an auxiliary and emergency means for increasing the pressure with which the neutral brake of the reverse gear mechanism is applied, thus assuring that the driven member thereof will be held firmly and positively against rotation when both forward and reverse clutches are disengaged.

A further object of the invention is to provide a simple form of mechanism of the above character having a single control lever for its actuation and being adapted to the selective employment of the auxiliary neutral brake applying parts thereof.

Further objects and advantages of the invention will be made evident hereinafter.

Referring to the drawings which are for illustrative purposes only,—

Fig. 1 is a partly sectioned elevation of a reverse gear mechanism embodying a simple and effective form of my invention.

Fig. 2 is an enlarged fragmentary cross section taken substantially on the plane represented by the line 2—2 of Fig. 1.

Fig. 3 is an enlarged fragmentary section taken on a plane represented by the line 3—3 of Fig. 2.

Fig. 4 is a schematic perspective view showing the neutral brake and the clutch operating mechanism of my invention.

Fig. 5 is a partly sectioned elevation as indicated by the arrow 5 of Fig. 4.

Fig. 6 is an enlarged fragmentary cross section taken as indicated by the line 6—6 of Fig. 5.

In the preferred form of the invention shown in Fig. 1, a base or supporting structure 11 is equipped with suitable bearings 12 adapted to support a drive shaft 13 which may be driven from a source of power by use of a pulley 14 or equivalent mechanism. Rotatably mounted on the central portion of the drive shaft 13 is a driven member 15 having power transfer means thereon in the form of a sprocket 16 over which a chain may be extended to a device which is to be driven. The embodiment of the invention shown is designed and particularly adapted for use in driving the draw-works of a well drilling rig, but it is evident that the invention may be used in the driving of various other devices.

At the leftward end of the driven member 15 is a brake drum 17 and a forward drive clutch mechanism 18 adapted to accomplish a direct drive connection between the drive shaft 13 and the driven member 15 so that when the clutch mechanism 18 is engaged the driven member 15 will rotate with the drive shaft 13. At the rightward end of the driven member 15 is a reverse gear mechanism 20 having a reverse clutch mechanism 21 which may be engaged so as to cause the reverse gear mechanism 20 to drive the driven member 15 in a direction opposite to the rotation of the drive shaft 13. As the general construction of reverse gear mechanisms and their forward and reverse clutches are well known to the art these parts are only generally indicated and are not shown in detail. Many forms and types of clutch and gear mechanisms may be employed in the making of a reverse gear mechanism of the general character above described.

The neutral brake, the clutch operating mechanism and the neutral brake operating mechanism forming the principal parts of my invention are best shown in the diagrammatic view, Fig. 4. In the description of Fig. 4, reference will be made to the other views of the drawings in which the parts described are also shown. The neutral brake 22 of the reverse clutch mechanism may conveniently consist of a steel band 23 secured at its forward end 24 to the base structure 11 by means of a U-bolt or inverted stirrup 25, as shown in Figs. 1 and 2. This steel band, or brake band 23, is lined with an inner facing of break lining material 26 and extends over the brake drum 17 to be connected at its rearward end 27 to a neutral brake applying means 28. The neutral brake applying mechanism 28 consists essentially of a crank member 30 having a primary lever 31 equipped with a cam 32 and a follower 33 adapted to engage the cam 32. The crank member 30, as shown in Figs. 2 and 3, has a boss 34 at its leftward end, which is bored to receive a pin 35 carried by a stationary bracket 36 mounted on the base structure 11 of the reversing gear mechanism. Extending upwardly from the boss 34 and the rearward end of the crank member 30 is a secondary lever or crank arm 37 consisting of an inverted U-shaped frame 38 having a boss 40 which fits the pin 35 on the side of the bracket 36 opposite to the position of the boss 34. Above the bracket 36 there is an opening 41 in the frame 38, and above the boss 40 a relatively small opening 42 is formed in the frame 38. The rearward end 27 of the brake band 23 is provided with an attachment member 43 extending into the opening 41 of the secondary crank arm 37 and engaging a pin 44 which projects through both of the openings 41 and 42. The raising of the primary lever 31 causes rotation of the crank member 30 in anticlockwise direction, and pulls the brake band 23 up tight so that it is frictionally applied to the brake drum 17. The follower means 33 consists of a body 45 in the form of a clevis. This body 45 is secured to the actuating lever arm 46 of a cross yoke 47 hinged on a vertical pin 48. As shown in Fig. 2, the vertical pin 48 may be supported by a bracket 50 carried by a cross member 51 which extends across the base 11 between the longitudinal I-beams 52 of the base member 11. The yoke 47 has the lever 53 and 54 thereof respectively connected by rods 55 and 56 with forward and reverse clutch engaging forks 57 and 58. The body 45 of the follower means 33 is connected by a rod 60 with an operating crank or lever 61 carried on a horizontal shaft 62, the leftward end of which shaft carries a shift arm 63 having a rightwardly facing notch 64 at its upper end. The shaft 62 is carried in bearings 65 and 66 situated forwardly of the base 11 so that the shaft 62 or bearings 65 and 66 are not shown in Fig. 1. The leftward bearing 65, as shown in Figs. 5 and 6 supports a shift frame 67 having a lateral slot 68 therein which is substantially centralized with respect to a vertical plane through the axis of the shaft 62. Adjacent to the slot 68 is a slot 70 which is offset in the manner shown in Fig. 6 and connects with the center of the slot 68 through a gate or opening 71. The upper end of the shift arm 63 resides in the slot 68 and the rightwardly facing notch 64 thereof coincides with the opening 71 of the frame 67 when the shift arm 63 is in central or neutral position. By means of a universal and nonrotating joint 72, a control lever 73 is supported on the bearing member 65 in such position that it will extend upwardly through the frame 67. In Figs. 5 and 6, the control lever 73 is shown in neutral position and extending upwardly through the gate or opening 71. The lateral slot 70 of the frame 67 receives the upper end of an auxiliary shift arm 75 which is mounted on the leftward end of a shaft 76 also carried by the bearings 65 and 66. A crank 77 mounted on the rightward end of the shaft 76 is connected by means of a clevis 78 with a bar 80 which has a slotted head 81 on its forward end for engaging that portion of the pin 44 which passes through the opening 42 of the crank member 30 which forms part of the neutral brake applying means 28. The upper end of the auxiliary shift arm 75 has a leftwardly facing notch 83 which coincides with the gate 71 of the frame 67 when resting at the forward end of the slot 70.

From Figs. 5 and 6, it will be perceived that the lever 73 may be moved out of the gate 71 either into engagement with the notch 64 or the notch 83 so that selectively the shift arms 63 and 75 with their associated mechanisms may be actuated.

In Figs. 2 to 6 the actuating mechanism is in neutral position. In other words, the yoke 47 is held in centralized position so that neither the forward drive clutch 18 nor the reverse drive clutch 21 are engaged. Corresponding to this neutral position of the forward and reverse clutch actuating parts, the roller 85 of the follower means 33 coincides with the flattened peak 86 of the cam 32 thereby holding the outer end of the lever 31 in raised position, as clearly shown in Fig. 2, so as to constrict the brake band 23 and cause it to frictionally engage the brake drum 17. The above described disposition of the parts of the actuating mechanism of the invention shows clearly that when the reverse gear mechanism is in neutral, the neutral brake 23 of the mechanism will be applied so as to resist rotation of the driven member 15. When it is desired to throw the reverse gear mechanism into direct or forward drive, the lever 73, Fig. 6, is moved leftwardly out of the gate 71 into the notch 64 and the shift arm 63 is swung forwardly into the position indicated by dotted lines 87. This casuses the shaft 62 and the crank 61 of Fig. 4 to rotate in anticlockwise direction, pulling the rod 60, the follower means 33 and the lever 46 in forward direction and producing an anticlockwise rotation of the yoke 47, which results in the rod 55 moving the lower end of the forward drive clutch actuating fork 57 in the direction indicated by the arrow 88. During this movement of the cooperating parts, the body 45 of the follower means 33 moves leftwardly from its position of Fig. 2 and the roller 85 thereof traverses the leftward face 90 of the cam 32, permitting the lever 31 to drop and thereby releasing the neutral brake so that the retarding action of the neutral brake will not be present during the driving of the driven member 15 by the forward clutch means 18.

Should it now be desired to throw the reverse gear mechanism into "reverse", the control lever 73 is moved from its position indicated by dotted lines 91 of Fig. 6 in the direction of the arrow 92 into the rearward end of the slot 68. In moving from the forward end of the slot 68 to the rear end thereof the control lever 73 must pass through neutral or centralized position, and in a like manner each of the parts operated by the control lever 73 must pass through neutral position as they move into cooperative positions for causing engagement of the reverse clutch means 21 by the reverse clutch fork 58. Therefore, as the lever is swung rearwardly from its position at 91 in the forward end of the slot 68, the roller 85 of the follower means 83 moves rightwardly across the sloping face 90 of the cam 32 and raises the outer end of the lever 31 with the result of applying the neutral brake 23 when the forward drive clutch 18 is released and during the time the clutch actuating mechanism is moving toward reversed position. The neutral brake 23 brings the driven member 15 to a stop or near stop while the actuating mechanism is passing through neutral position.

As the control lever 73 is continued rearwardly in the slot 68 from neutral position, the bar 60, the follower mechanism 33 and the lever 46 will be moved rearwardly in accordance therewith causing a clockwise rotation of the yoke 47 and the consequent movement of the bar 56 in proper direction to cause actuation of the reverse clutch yoke 58. Before the revese clutch means 21 becomes fully engaged, the roller 85 will traverse the sloping face 94 of the cam 32 again permitting the lever 31 to drop and release the neutral brake 23. It will be perceived that although the brake 23 may be adjusted, as indicated in Fig. 2, by nuts 95 on the stirrup 25, the pressure with which the neutral brake is applied in consequence of the actuating mechanism moving into neutral position is determined by the throw of the cam 32. In other words, the follower means 33 can lift the outer end of the lever 31 a specified distance only; therefore, as the brake band 26 wears, the gripping effect on the brake drum 17 decreases and may permit a slow rotation of the driven member 15 when the reverse gear mechanism is in neutral position and a load is exerted on the driven member 15 through the chain which extends over its sprocket 16. In addition to the simple clutch and neutral brake actuating mechanism, my invention includes an auxiliary or emergency brake means or brake applying means, the parts of which have been previously described and are utilized in the following manner:

In the use of the reverse gear mechanism, the initial step toward stopping the driven member 15 is accomplished by moving the control lever 73 into centralized or neutral position, as shown in Figs. 5 and 6. This movement of the control lever 73 results in actuation of the neutral brake applying means 28. The control lever 73 is then moved through the gate 71 into engagement with the leftwardly facing notch 83 of the auxiliary shift arm 75, as indicated by dotted lines 97 of Fig. 6. The shift arm 75 is then moved in the slot 70 of the frame 67 in the direction indicated by the arrow 98, producing an anticlockwise rotation of the shaft 76 and the crank arm 77 which will pull the rod 80 forwardly so that the end of the slot 100 in the head 81 will engage the pin 44 and will exert a direct pull on the secondary lever 37 and the rear end 27 of the brake band 23, causing further tension to be applied to the brake band 23 and thereby causing the brake lining 26 to frictionally engage the drum 17 with greater pressure so that the drum 17 and the driven member 15 to which it is connected may be positively held from rotation. The shift arms 63 and 75 are respectively provided with locking or retaining springs 105 and 106 which extend upwardly so as to engage depressions or notches 107 and 108 in the frame member 67. These locking springs 105 and 106 hold the shift arm 63 and 75 in centralized position when the control lever 73 is disengaged from either one of them.

Although I have herein shown and described a simple and practical embodiment of my invention, it is recognized that certain parts or elements thereof are representative of other parts, elements or mechanisms which may be employed in substantially the same manner to accomplish substantially the same results; therefore, it is understood that my invention is not to be limited to the details disclosed herein, but shall be accorded the scope of the following claims.

I claim as my invention:

1. A reversing drive mechanism of the character described, including: a drive means and a driven means; a direct drive and a reversing drive therebetween; a neutral brake adapted to stop the driven means when shifting from one drive to the other; a single operating mechanism interconnecting the direct and reverse driving mechanisms and neutral brake whereby the application of the neutral brake is performed by a shift from one driving means to the other; and an auxiliary brake applying mechanism for positively applying said neutral brake when it is desired to positively hold said driven means from rotating.

2. A reversing drive mechanism of the character described including: a drive means and a driven means; a direct drive and a reversing drive therebetween; neutral brake means adapted to stop the driven means when shifting from one drive to the other; a single operating mechanism interconnecting the direct and reverse driving mechanisms and neutral brake means whereby the application of the neutral brake means is performed by a shift from one driving means to the other; and an auxiliary brake applying mechanism for increasing the gripping effect of said neutral brake means when it is desired to positively hold said driven means from rotating.

3. A reversing drive mechanism of the character described, including: a drive means and a driven means; a direct drive and a reversing drive therebetween; a neutral brake adapted to stop the driven means when shifting from one drive to the other; a single operating mechanism interconnecting the direct and reverse driving mechanisms and neutral brake whereby the application of the neutral brake is performed by a shift from one driving means to the other, said single operating mechanism having a single manually engageable lever; and an auxiliary brake applying mechanism actuated by said manually engageable lever for positively applying said neutral brake when it is desired to positively hold said driven means from rotating.

4. A reversing drive mechanism of the character described, including: a drive means and a driven means; a direct drive and a reversing drive therebetween; neutral brake means adapted to stop the driven means when shifting from one drive to the other; a single operating mechanism interconnecting the direct and reverse driving mechanisms and neutral brake means whereby the application of the neutral brake means is performed by a shift from one driving means to the other, said single operating mechanism having a single manually engageable lever; and an auxiliary brake applying mechanism actuated by said manually engageable lever for increasing the gripping effect of said neutral brake means when it is desired to positively hold said driven means from rotating.

5. In reversing drive having a drive member and a driven member, in combination with direct and reverse engaging mechanism: a neutral brake; operating mechanism therefor interconnected with the direct and reverse engaging mechanisms whereby the neutral brake will be applied intermediate the shift from the drive in one direction to the other; and auxiliary means operable by said operating mechanism for positively preventing rotation of said driven member.

6. In a reversing drive having a drive member and a driven member in combination with direct and reverse engaging mechanisms: a neutral brake; operating mechanism therefor interconnected with the direct and reverse engaging mechanisms whereby the neutral brake will be applied intermediate the shift from the drive in one direction to the other; and auxiliary means for applying additional force to said neutral brake so as to cause it to positively prevent rotation of said driven member.

7. In a reversing drive having a drive member and a driven member, in combination with direct and reverse engaging mechanisms: a neutral brake; operating mechanism therefor interconnected with the direct and reverse engaging mechanisms whereby the neutral brake will be applied intermediate the shift from the drive in one direction to the other; means for automatically locking said brake in engaged position at the time both engaging mechanisms are disengaged; and auxiliary means operable by said operating mechanism for positively preventing rotation of said driven member.

8. In a reversing drive having a drive member and a driven member, in combination with direct and reverse engaging mechanisms: a neutral brake; operating mechanism therefor interconnected with the direct and reverse engaging mechanisms whereby the neutral brake will be applied intermediate the shift from the drive in one direction to the other; means for automatically locking said brake in engaged position at the time both engaging mechanisms are disengaged; and auxiliary means for applying additional force to said neutral brake so as to positively prevent rotation of said driven member.

9. In a device of the class described including forward and reverse mechanisms and a neutral brake: means adapted for sequential operation of the mechanisms and brake whereby the brake will be applied during the shift from one mechanism to the other; and auxiliary means associated with said means for sequential operation of the mechanisms for increasing the force with which said neutral brake is applied.

10. In a device of the class described including forward and reverse mechanisms and a neutral brake: means adapted for sequential operation of the mechanisms and brake whereby the brake will be applied during the shift from one mechanism to the other; locking means adapted to automatically hold said neutral brake in engaged position when both mechanisms are disengaged; and auxiliary means associated with said means for sequential operation of the mechanisms for increasing the force with which said neutral brake is applied.

11. A reversing drive mechanism of the character described, including: a drive means and a driven means; a direct drive and a reversing drive therebetween; a neutral brake adapted to stop the driven means when shifting from one drive to the other; a single operating mechanism interconnecting the direct and reverse driving mechanisms and neutral brake whereby the application of the neutral brake is performed by a shift from one driving means to the other, said single operating mechanism having a single manually engageable lever; means for automatically locking said brake in engaged position wherein both drive means are disengaged; and an auxiliary brake applying mechanism actuated by said manually engageable lever for positively applying said neutral brake when it is desired to positively hold said driven means from rotating.

12. A reverse gear mechanism having a drive member, a driven member and forward and reverse clutches, including: an actuating mechanism for selectively engaging said forward and reverse clutches, said mechanism having an intermediate position in which neither of said clutches is engaged; a neutral brake having an actuating lever with a cam formed thereon; and a follower moved by said actuating mechanism and being adapted to engage said cam when said actuating mechanism is in intermediate position and thereby move said lever so as to actuate said neutral brake.

13. A reverse gear mechanism as defined in claim 12, including an auxiliary brake applying means consisting of a device adapted to swing said actuating lever beyond the extreme position into which it is moved by the cooperation of said follower with said cam.

14. A reverse gear mechanism having a drive member, a driven member and forward and reverse clutches, including: an actuating mechanism for selectively engaging said forward and reverse clutches, said mechanism having an intermediate position in which neither of said clutches is engaged; a neutral brake having an actuating lever with a cam formed thereon; a follower moved by said actuating mechanism and being adapted to engage said cam when said actuating mechanism is in intermediate position and thereby move said lever so as to actuate said neutral brake; auxiliary brake applying means consisting of a device adapted to swing said actuating lever beyond the extreme position into which it is moved by the cooperation of said follower with said cam; and a single operating lever adapted for selective operation of said actuating mechanism and said auxiliary brake applying means.

15. A brake structure of the character described, including: a brake having an actuating lever with a cam formed thereon; a follower for engaging said cam so as to operate said lever; and auxiliary means for moving said lever beyond the extent of its movement by cooperation of said cam and follower for increasing the pressure with which said brake member is actuated.

16. A brake structure of the character described, including: a brake having an actuating lever; cam means for operating said lever; and auxiliary means for moving said lever beyond the extent of its movement by cooperation of said cam means for increasing the pressure with which said brake member is actuated.

17. A reversing drive mechanism of the character described, including: a drive means and a driven means; a direct drive and a reversing drive therebetween; a brake means adapted to stop the driven means when shifting from one drive to the other; a single operating mechanism interconnecting the direct and reverse driving mechanisms and brake means whereby the application of the brake means is performed by a shift from one driving means to the other, said single operating mechanism having a single manually engageable lever; and an auxiliary brake applying mechanism actuated by said manually engageable lever for positively applying said brake means when it is desired to positively hold said driven means from rotating.

In testimony whereof, I have hereunto set my hand at Los Angeles, California, this 2 day of April, 1930.

GUGLIELMO TREMOLADA.